April 11, 1961 L. A. EDWARDS 2,979,216
BALE LIFTER
Filed Sept. 2, 1955 2 Sheets-Sheet 1
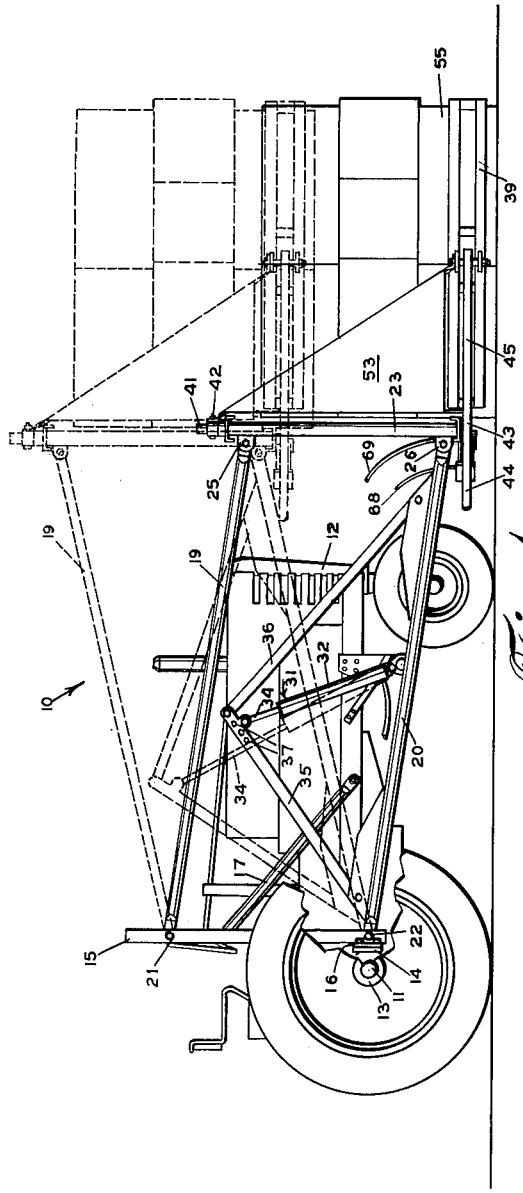
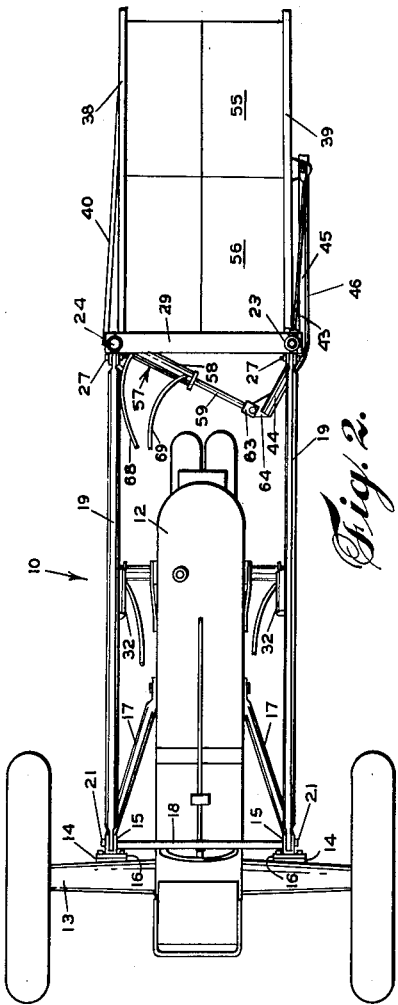
INVENTOR.
Lewis A. Edwards April 11, 1961   L. A. EDWARDS   2,979,216
BALE LIFTER
Filed Sept. 2, 1955   2 Sheets-Sheet 2
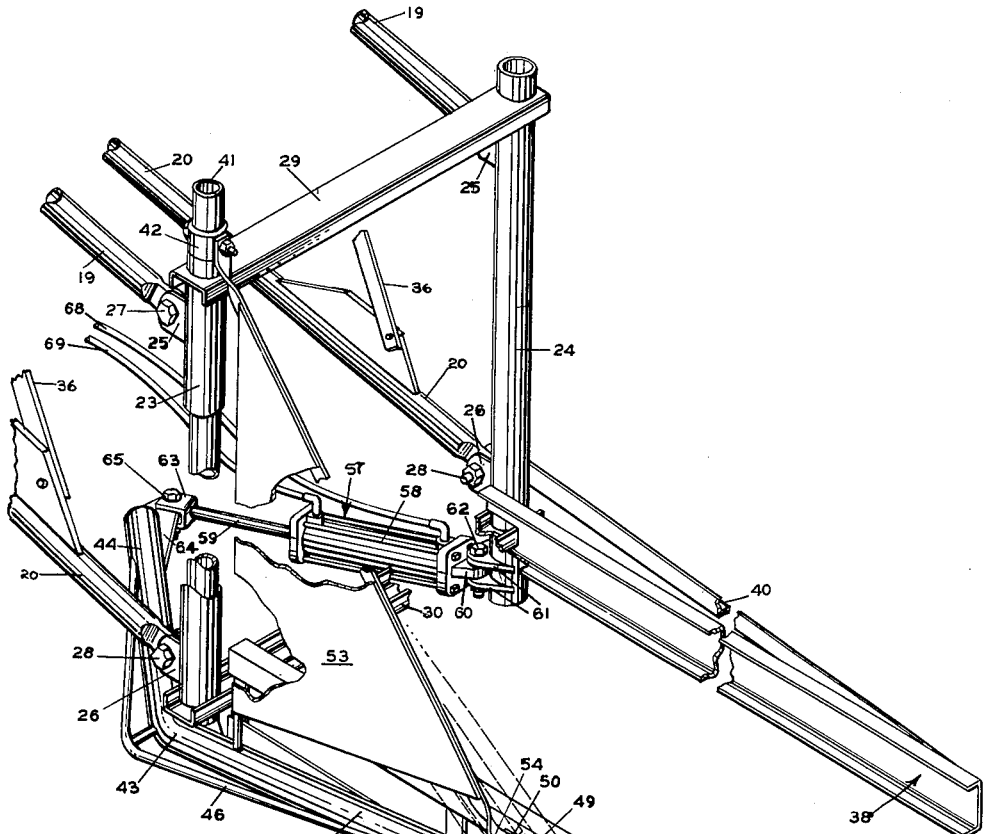
Fig. 3.
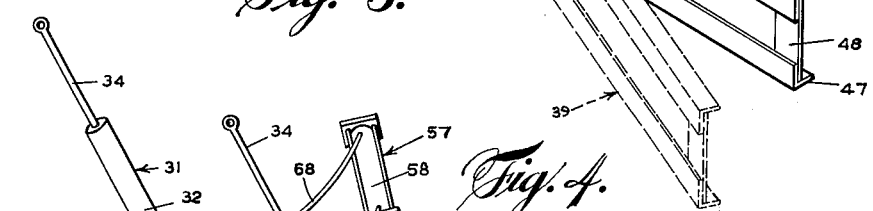
Fig. 4.
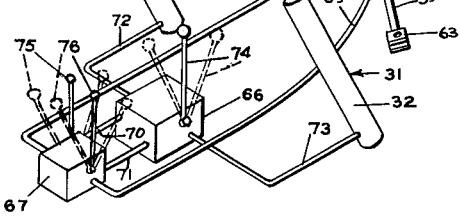
INVENTOR.
Lewis A. Edwards
by A. Hiram Sturges
Agent

United States Patent Office 2,979,216
Patented Apr. 11, 1961

2,979,216

BALE LIFTER

Lewis A. Edwards, Clearwater, Nebr.

Filed Sept. 2, 1955, Ser. No. 532,261

2 Claims. (Cl. 214—147)

This invention relates to farm machinery and more particularly to bale lifting machines.

An object of the present invention is to provide a new and improved bale lifting machine.

Another object of the present invention is to provide a bale lifting machine embodying a particularly constructed frame which may be pivotally attached to a conventional type farm tractor. The frame carries a pair of laterally spaced apart jaws which are disposed in front of the tractor and are adapted to be relatively moved toward each other for gripping a load of bales and away from each other for releasing a gripped load of bales, and, in addition, may be raised and lowered with respect to the tractor in such manner that the gripped bale or bales may be raised and lowered or transported in a substantially level position regardless of the elevated position of the jaws with respect to the tractor.

Another object of the present invention is to provide a bale lifting machine as described above wherein one of the jaws is rigidly attached to the frame and the other of the jaws is movable bodily toward and away from the rigidly attached jaw, and, in addition, is pivotally mounted intermediate its ends whereby the jaws are particularly adapted simultaneously to grip and lift a plurality of bales which may be irregular in size or stacked in an unaligned relationship.

Yet another object of the present invention is to provide a bale lifting machine as described above and adapted for use with tightly stacked bales whereby the jaws may be loaded without manual handling of the bales or the use of loading skids and the like.

Also, it is an object of the present invention to provide a highly efficient bale lifting machine which is operative to handle a substantially greater number of bales per unit of time than was heretofore possible.

Still another object of the present invention is to provide a bale lifting attachment which may be easily attached to or detached from substantially any conventional farm tractor.

These and other objects and advantages of the present invention will be apparent from the following description of one form of the invention, taken with the accompanying drawings; wherein:

Fig. 1 is a view in side elevation of the bale lifter of the present invention;

Fig. 2 is a plan view of the bale lifter of the present invention;

Fig. 3 is an enlarged perspective view of the jaws and a portion of the associated structure of the bale lifting machine; and Fig. 4 is a schematic view of the hydraulic system which is operative for use with the bale lifting machine.

Referring now to Figs. 1 and 2 of the drawings, the frame of the bale lifting machine 10 of the present invention there illustrated, is pivotally connected adjacent to the rear axle 11 of a conventional type farm tractor 12.

The rear axle housing 13 of the tractor carries a pair of rigidly attached pads 14 which are spaced on opposite sides of the chassis.

Extending upwardly from each of these pads is a pair of parallel channel bars 15. The lower ends of each channel bar 15 is welded or otherwise rigidly connected to an attachment plate 16 which is bolted to a respective one of the pads 14, and the upper ends of the channel bars 15 extend an equal distance above the top of the tractor 12. Also, the channel bars 15 are supported by a pair of braces 17 which may be bolted at their lower ends to the opposite sides of the chassis of the tractor 12 intermediate the front and rear axles thereof, and which may be bolted at their upper ends to the intermediate portions of the channel bars 15. The channel bars 15 are strengthened further by a laterally extending cross brace 18 which may be rigidly connected between the upper end portions of the channels.

Pivotally connected to the channel cars 15 is a forwardly and longitudinally extending frame portion embodying a pair of interconnected laterally spaced apart frame sections which are disposed on opposite sides of the tractor chassis.

As illustrated in Figs. 1 and 2, each frame section includes an upper longitudinally extending boom 19 and a parallel lower longitudinally extending boom 20. The rearward ends of the pair of laterally spaced apart upper booms 19 are pivotally mounted to the upper end portions of the channel bars 15 and between the flanges thereof by a pair of axially aligned bolts 21 which are received through suitable openings in the channel bars 15 and booms 19. The rearward ends of the pair of laterally spaced apart lower booms 20 are pivotally mounted in a similar manner to the lower end portions of the channel bars 15 by a pair of axially aligned bolts 22.

The front ends of the upper and lower booms are pivotally mounted to a pair of laterally spaced apart substantially vertically disposed pipes 23 and 24 which are provided with upper and lower pairs of ears 25 and 26 for receiving the front ends of the booms 19 and 20. The front ends of the upper pairs of booms 19 are pivotally mounted to the pairs of ears 25 by a pair of axially aligned bolts 27 which are received through suitable openings in the ears 25 and booms 19, and the front ends of the lower pair of booms 20 are pivotally mounted in a similar manner to the pairs of ears 26 by a pair of axially aligned bolts 28.

Finally, the front ends of the frame sections extend well forwardly of the tractor and are rigidly interconnected by a pair of parallel and laterally extending channel bars 29 and 30.

The upper channel 29 is provided with a pair of openings which receive the upper end portions of the pipes 23 and 24 whereby the channel 29 may be welded to the pipes, and the lower channel 30 may be attached to the lower ends of the pipes 23 and 24 in a similar manner. More particularly, the construction is such that the channels 29 and 30 have substantially the same span as the cross brace 18 and each frame section comprises a similarly constructed parallelogram. Also, the axes of the bolts 21, 22, 27 and 28 are substantially parallel to the rear axle 11 of the tractor 12. Thus, it may be seen that as the frame is swung about its axes to raise and lower it between a lower full line position, as illustrated in Fig. 1 and an upper dotted line position, the pipes 23 and 24 remain substantially vertically disposed when the tractor is resting on a substantially horizontal surface.

A pair of conventional hydraulic expansion-contraction motors 31 may be utilized for raising and lowering the frame with respect to the tractor. As shown in Figs. 1, 2 and 4, one of these motors 31 is arranged on each side of the tractor chassis between the front and rear axles thereof. The cylinder 32 of each motor is pivotally connected at its lower end to a bracket 33, one of which is disposed on each side of the chassis, and the upper end of each piston rod 34 is pivotally connected to the rear member 35 of a triangular frame, one of which is carried by each of the lower booms 20. Thus, when the hydraulic motors 31 are expanded the frame is raised, and when the hydraulic motors are contracted the frame is lowered.

Also, the lower ends of the front members 36 and rear members 35 of each triangular frame may be pivotally mounted to their respective lower booms 20, and the upper end of one of the frame members in each triangular frame may be provided with a series of adjustment bolt receiving openings 37 whereby the upper ends of members 35 and 36 may be bolted together in a plurality of positions for varying the effect of the piston strokes of the motors 31.

Further, the bale lifting machine includes a pair of laterally spaced apart jaws 38 and 39 which are adapted to grip a bale or a plurality of bales for loading the machine as is subsequently more fully described, raise the bales into a substantially level transport position, maintain this position as the tractor is driven to a stacking area and thereafter release the gripped bales for unloading the machine.

As illustrated in Fig. 3, the right hand jaw 38 is a forwardly extending channel bar which is arranged with the flanges disposed inwardly. This channel bar is disposed substantially normal to the right hand pipe 24 and is rigidly welded to the lower extremity of the pipe 24. Also, the channel 38 is rigidly fixed into this position by an angle iron brace 40 which is welded at its front end to the outer side of the channel bar 38 and is welded at its rear end to the lower portion of the right hand pipe 24. The right hand side of the front end of the brace 40 is tapered down to meet the outer surface of the channel 38 whereby the jaw and brace are somewhat wedge shaped in plan.

Rotatably arranged in the left hand pipe 23 is a pipe or spindle 41. The upper end of the spindle extends above the upper end of the pipe 23 and is provided with a cylindrical collar 42 which may be welded or otherwise fixed to the spindle 41 and has the same diameter as the pipe 23. The lower end of the spindle 41 extends below the lower end of the pipe 23 and is welded to the intermediate portion of a substantially horizontally disposed tubular arm 43.

As shown in Fig. 3, the arm 43 is disposed substantially normal to the spindle 41 and is provided with a rear portion 44 which extends rearwardly and inwardly from the spindle 41 when the front portion 45 of the arm extends forwardly from the spindle. The outer side of this arm is provided with a strengthening member 46. Thus, it may be seen that the arm 43 is mounted to the lower end of the spindle 41 and is arranged to swing in an arc which defines a plane that is substantially normal to the axis of the spindle. The lower edge of the cylindrical collar 42 rides on the upper edge of the pipe 23 for preventing the spindle 41 from sliding downwardly through the pipe 23 during the swinging movements of the arm 43.

The front or forwardly extending portion 45 of the arm is provided with a length which is substantially equal to one-half of the length of the right hand jaw 38. The left hand jaw 39 includes a pair of parallel angle bars 47 which are fixedly connected together by a plurality of spacers 48, and the upper and lower flanges of the angle bars are disposed inwardly in a manner similar to the upper and lower flanges of the right hand jaw 38. Further, the jaw 39 is provided with a length which is substantially equal to the length of the fixed jaw 38, and is pivotably connected at its center portion to the outer end of the forwardly extending portion 45 of the arm 43. As shown in Fig. 3, this pivotal connection includes a pair of vertically spaced apart ears 49 which are carried by the angle bars 47 and which rotatably receive a bolt 50 which, in turn, is rotatably received in a pipe section 51 which extends vertically through the outer end of the arm 43 and is fixed thereto. The bolt 50 is retained in position by a nut 52. Also, the arm 43 carries an upstanding triangular shield 53 which is connected at its upper vertex to the collar 42 and is connected at its rear vertex to the arm 43. The front vertex of the shield 53 includes a bracket 54 having an opening for receiving the bolt 50.

More particularly, the construction and arrangement is such that the jaw 39 is swingable with respect to the arm 43 about an axis which is substantially parallel to the axis of the spindle 41. The jaw 39 is arranged so that a horizontal plane will pass through the longitudinal centerline of both jaws 38 and 39. Also, the rear end of the jaw 39 is arranged to swing freely toward the fixed jaw 38, as shown by dotted lines in Fig. 3. The front end of the jaw 39 is prevented from swinging freely toward the front end of the fixed jaw by engagement of the rear end of the jaw 39 with the arm 43. However, the arrangement is such that when the jaws 38 and 39 are carrying a load having a two bale width, as illustrated in Fig. 2, there is sufficient space between the arm 43 and rear end of the jaw 39 to enable the front end of the jaw 39 to swing toward the front end of the fixed jaw 38 to accommodate operation of the jaws with bales of different widths.

Moreover, the jaws 38 and 39 are each provided with a length which is substantially equal to twice the length of a standard size bale of hay. The pivot point of the swingable jaw 39 is arranged at the midpoint thereof so as to be disposed substantially in alignment with the adjacent ends of two bales when the bales are arranged in an end to end relation, as illustrated in Fig. 2.

From the foregoing description it may be seen that the jaws are particularly adapted to grip and pick up bales having different widths. This is particularly important because the bale binders now in use tie bales having dimensions approximating a standard size, but occasionally varying in one dimension or the other due to the inherent nature of the material being bound.

As illustrated in Fig. 2, the bale 55 has a slightly reduced width, but the disposition of the pivot point of the jaw 39 enables its outer end to swing toward the outer end of the fixed jaw 38 and thus firmly engage the sides of both the bale 55 and the bale 56. The jaws are equally well operative if the narrow width bale 55 is in the position of the bale 56. Moreover, the pressure exerted on the bales by movement of the swingable jaw toward the fixed jaw always moves the bales into gripping engagement with the fixed jaw 38 regardless of the location of a bale having an off sized width. Thus, the irregularity in width always manifests itself adjacent to the swingable jaw 39 and is obviated as previously noted.

Further, the invention includes a conventional expansion-contraction type hydraulic motor 57 for pivoting the arm 43 to swing the jaw 39 toward and away from the fixed jaw 38. As illustrated in Fig. 3, this motor is preferably of the double-acting type and comprises a cylinder 58, a piston (not shown), and a piston rod 59. The right hand end of the cylinder 58 is provided with a forwardly extending bracket 60 which is arranged between a pair of rearwardly extending vertically spaced apart ears 61. These ears are carried by the lower end of the right hand pipe 24, whereby the cylinder 58 is pivotally mounted to the pipe 24 by a bolt 62 which is received through suitable openings in the ears 61 and the bracket 60 of the cylinder. The left hand end of the piston rod 59 is fixedly connected to a collar 63 having a pair of vertically spaced apart ears disposed on either side of a bracket 64 which is fixedly connected to the rearward end of the arm 43. This pivotal connection is completed by a bolt 65 which is received through suitable openings in the ears and in the bracket 64. Thus, it may be seen that the hydraulic motor 57 may be contracted for swinging the movable jaw 39 away from the fixed jaw 38 and the hydraulic motor may be expanded for swinging the movable jaw 39 toward the fixed jaw 38.

Since the jaws 38 and 39 are particularly adapted for use with loads having a double bale width, the stroke of the piston rod 59 is such that the movable jaw 39 may be swung into a position adjacent to the fixed jaw 38, whereby the center portions of the two jaws are spaced apart a distance substantially less than the double width of a standard size bale. Also, the movable jaw may be swung away from the fixed jaw into a position wherein the center points of the two jaws are spaced apart a distance which is substantially greater than the length of a standard size bale. It is contemplated that the jaws may easily be adapted for use with loads having a single bale width by either increasing the stroke of the piston rod 59 or by bending the rear end 44 of the arm 43 toward the hydraulic motor 57.

A conventional hydraulic system may be provided for selectively operating the hydraulic motor opening and closing the jaws 38 and 39, and a pair of hydraulic motors 31 for raising and lowering the frame and jaws. As illustrated in Fig. 4, the hydraulic motor 57 is preferably of the double-acting type and the hydraulic motors 31 may be of the single-acting type.

The hydraulic system includes a first unit 66 embodying a pump, a fluid reservoir, and a valve, and a second unit embodying a valve 67. Both units should be arranged conveniently within the reach of the tractor operator. The front and rear ends of the hydraulic cylinder 58 are connected by a pair of conduits 68 and 69 to the opposite sides of the valve 67. This valve is connected by a conduit 70 to the pump and by a conduit 71 to the hydraulic fluid reservoir in the unit 66. The lower ends of the hydraulic cylinders 32 are connected by a pair of conduits 72 and 73 to the opposite sides of the valve in the unit 66.

When the valve handle 74 is in full line position, as illustrated by Fig. 4, it is in a neutral position, whereby fluid flow through the conduits 72 and 73 is blocked. When the valve handle 74 is moved into the forward dotted line position the conduits 72 and 73 are connected to the discharge end of the hydraulic pump in the unit 66 and the motors 31 are expanded to raise the frame and jaws 38 and 39, when the valve handle 74 is moved into a rearward dotted line position, the conduits 72 and 73 are disconnected from the discharge end of the pump and are connected to the fluid inlet side of the hydraulic fluid reservoir in the unit 66 whereby the weight of the frame and jaws operate to contract the hydraulic motors 31 and lower the frame and jaws 38 and 39.

Also the valve 67 may be manually operated by a pair of valve handles 75 and 76. These handles, when in the solid line positions as illustrated in Fig. 4, are in a neutral position whereby fluid flow through the conduits 70, 71 and 68 and 69 is blocked. When the handle 75 is thrown into the forward dotted line position the front end of the cylinder 58 is connected through the conduits 68 and 70 to the discharge end of the hydraulic pump in the unit 66. If the handle 76 is then thrown into the rearward dotted line position the rearward end of the hydraulic cylinder 58 is connected through the conduit 69 and the conduit 71 to the inlet side of the hydraulic fluid reservoir in the unit 66, and the motor 57 is expanded to swing the movable jaw 39 toward the fixed jaw 38 for gripping a load of bales. When it is desired to open the jaws the valve handle 76 is thrown into the forward dotted line position for connecting the rearward end of the cylinder 58 to the discharge end of the hydraulic pump in the unit 66, and the valve handle 75 is thrown into the rearward dotted line position for connecting the forward end of the cylinder 58 to the inlet side of the hydraulic fluid reservoir in the unit 66. Thus, the motor 57 is contracted for opening the jaws 38 and 39.

From the foregoing description it may be seen that there has been provided a new and improved bale lifting machine embodying a particularly constructed frame which may be easily attached to or removed from a conventional type farm tractor. The frame is pivotally mounted to the tractor and carries a pair of laterally spaced apart jaws which are disposed in front of the tractor and are adapted to be relatively moved toward each other for gripping a load of bales and away from each other for releasing a load of bales. In addition, the jaws may be raised and lowered with respect to the tractor in such a manner that a load of bales may be raised or lowered or transported in a substantially level position regardless of the elevated position of the jaws with respect to the tractor. This feature enables the machine to stack the bales in a compact, neat, orderly fashion, and conversely, enables the jaws to obtain a firm grip on a load of bales being removed from the top of a stack of bales.

Moreover, due to the particular construction of the movable jaw, the jaws are particularly adapted for transporting a load including bales which may vary in size. Also, the machine may be operated without the use of loading skids and the like, and is operative to handle a substantially greater number of bales per unit of time than was heretofore possible. More particularly, when removing bales from a tightly arranged stack of bales, the jaws may be spread apart and the fixed jaw may be driven between the bales as a wedge to separate the load from the stack, the movable jaw being disposed on the open side of the load. Thereafter, the jaws may be closed to grip the load and raised to lift the load from the stack prior to transporting the load.

The foregoing description has been given for clearness of understanding only, and no unnecessary limitation should be implied therefrom, for it will be apparent to those skilled in the art that variations may be made in the structure without departing from the spirit and scope of the appended claims.

What is claimed is:

1. A grab for a bale lifter comprising: a frame forming a back side of said grab, a first jaw means rigidly connected to a forward side of said frame and extending forwardly therefrom, a lever pivotally connected intermediate its ends to said frame and adapted to pivot about a substantially vertical axis, said lever having a front end spaced laterally from said first jaw means and extending forwardly from the forward side of said frame, a second jaw means pivotally mounted intermediate its ends to the front end of said lever opposite said first jaw means and adapted to pivot about a substantially vertical axis, said first and second jaw means being very elongated and said first jaw means having straight inner gripping surfaces for freely sliding along and stabbing between oppositely disposed adjacent vertical sides of two bales disposed alongside of each other, said lever having a rearward end disposed rearwardly of said second jaw means, said jaw means both being of a vertical dimension for gripping only a lowermost tier of standard bales to be lifted so that the normal lack of vertical alignment of the sides of those bales which are of different tiers and one above the other does not cause the first jaw means to be prevented from stabbing between vertical stacks of bales, said first jaw means having an innermost surface being substantially firmly fixed thereto so that said innermost surface can engage bales directly substantially free of any interfering mechanism—said grab having only one bale-engaging jaw on the side of its first jaw means whereby as said one jaw of said first jaw means is stabbed longitudinally of itself into a stack of bales, the stack is engaged substantially only by surfaces of the one jaw of said first jaw means which are substantially continuous lengthwise of the said one jaw so bales are less likely to be knocked over during forward movement of said first jaw means and hydraulic cylinder means operatively connected to said rearward end of said lever for swinging said second jaw means toward said first jaw means for gripping a bale and away from said first jaw means for releasing a gripped bale, said grab having only one bale-engaging jaw means on the fixed jaw means side thereof whereby as said fixed first jaw means is stabbed longitudinally of itself between two stacks of bales it presents a surface substantially continuous lengthwise of said fixed first jaw means so bales are less likely to be knocked over during forward sliding of said first jaw between adjacent bales.

2. A grab for a bale lifter comprising: a frame forming a back side of said grab, a first jaw means rigidly connected to a forward side of said frame and extending forwardly therefrom, a lever pivotally connected intermediate its ends to said frame and adapted to pivot about a substantially vertical axis, said lever having a front end spaced laterally from said first jaw means and extending forwardly from the forward side of said frame, a second jaw means pivotally mounted intermediate its ends to the front end of said lever opposite said first jaw means and adapted to pivot about a substantially vertical axis, said first and second jaw means being very elongated and said first jaw means having straight inner gripping surfaces for freely sliding along and stabbing between oppositely disposed adjacent vertical sides of two bales disposed along side of each other, said lever having a rearward end disposed rearwardly of said second jaw means, said jaw means both being of a vertical dimension for gripping only a lowermost tier of standard bales to be lifted so that the normal lack of vertical alignment of the sides of those bales which are of different tiers and one above the other does not cause the first jaw means to be prevented from stabbing between vertical stacks of bales, said first jaw means having an innermost surface being substantially firmly fixed thereto so that said innermost surface can engage bales directly substantially free of any interfering mechanism—said grab having only one bale-engaging jaw on the side of its first jaw means whereby as said one jaw of said first jaw means is stabbed longitudinally of itself into a stack of bales, the stack is engaged substantially only by surfaces of the one jaw of said first jaw means which are substantially continuous lengthwise of the said one jaw so bales are less likely to be knocked over during forward movement of said first jaw means and hydraulic cylinder means operatively connected to said rearward end of said lever for swinging said second jaw means toward said first jaw means for gripping a bale and away from said first jaw means for releasing a gripped bale, said grab having only one bale-engaging jaw means on the fixed jaw means side thereof whereby as said fixed first jaw means is stabbed longitudinally of itself between two stacks of bales it presents a surface substantially continuous lengthwise of said fixed first jaw means so bales are less likely to be knocked over during forward sliding of said first jaw between adjacent bales, said jaws being provided with inwardly extending straight parallel bale-engaging portions the inner edges of which are spaced substantial distances inwardly from vertical inner surfaces of said jaws and extend lengthwise of said jaws whereby said jaws are adapted to engage a bale along straight lines and to sink into the loose hay of a bale more than would be possible if the inner surfaces of said jaws were disposed in vertical planes.

References Cited in the file of this patent

UNITED STATES PATENTS

| | | |
|---|---|---|
| Re. 23,694 | Ehmann | Aug. 4, 1953 |
| 1,121,130 | Rafferty | Dec. 15, 1914 |
| 2,284,006 | McLellan | May 26, 1942 |
| 2,488,767 | Drott et al. | Nov. 22, 1949 |
| 2,536,151 | Backofen et al. | Jan. 2, 1951 |
| 2,564,357 | Falkner | Aug. 14, 1951 |
| 2,578,802 | Heidrich et al. | Dec. 18, 1951 |
| 2,667,283 | MacDonald et al. | Jan. 26, 1954 |
| 2,674,387 | Ehmann | Apr. 6, 1954 |
| 2,693,285 | Buschibom | Nov. 2, 1954 |
| 2,757,813 | Adams | Aug. 7, 1956 |
| 2,782,067 | La Bonte et al. | Feb. 19, 1957 |
| 2,838,189 | Norbury | June 10, 1958 |

FOREIGN PATENTS

| | | |
|---|---|---|
| 712,121 | Great Britain | July 21, 1954 |